Patented Mar. 31, 1936

2,035,520

UNITED STATES PATENT OFFICE 2,035,520

EMULSIONS OF RESINS OF THE POLY-HYDRIC ALCOHOL POLYBASIC ACID TYPE AND THE APPLICATION THEREOF

William Baird, Manchester, England, assignor to Imperial Chemical Industries Ltd., a corporation of Great Britain No Drawing. Application December 24, 1930, Serial No. 504,636. In Great Britain December 27, 1929

3 Claims. (Cl. 134—26)

My invention relates to and comprises the preparation of emulsions from resins of the polyhydric-alcohol-polybasic acid type.

Polyhydric alcohol-polybasic acid resins are extensively used in compounding lacquers, varnishes and the like, being dissolved in suitable solvents or mixtures of solvents. Such lacquers or varnishes are often costly, the cost being dependent to a considerable degree on that of the solvents used. Moreover, such solvents are usually more or less inflammable and the use of lacquers or the like compounded by their aid involves certain fire hazards. Further the incorporation of certain agents known to the trade as flatting agents with such lacquers or varnishes to give stable and commercially satisfactory products is a difficult or impossible operation.

According to my invention I provide means for the production of a form of coating composition made from polyhydric alcohol-polybasic acid resins which can be brought into relatively stable combination with flatting agents in a simple and effective manner, I reduce the fire risks incidental to the use of lacquers and varnishes as above described and also the solvent costs. Further I provide means for producing on surfaces a matt or semi-matt finish.

This I accomplish by the intimated union of water with the organic solvents in which the resins are dissolved, as I have discovered, a very considerable proportion of the solvent or solvent mixture of organic solutions of polyhydric alcohol-polybasic acid resins may be replaced by water. I effect this replacement of organic solvent and such union of water and organic resin solution by emulsification by known means and I may or may not add an emulsifying agent or a protective colloid prior to or during emulsification.

As resins I may use the product obtained by the simple interaction of a polyhydric alcohol e. g. glycerol, and a polybasic acid, e. g. phthalic acid (or its anhydride), or the product of such interaction in presence of fatty oils, in which term is comprised, e. g. castor oil, linseed oil, tung oil, or the product of such interaction in presence of fatty acid, or the product of such interaction in presence of or combined with, a resin of the urea formaldehyde type, but I do not limit myself to these examples of polyhydric alcohol-polybasic acid resins or what may be termed modified polyhydric alcohol-polybasic acid resins.

As solvents I may use any suitable solvent for such resins, e. g. solvent naphtha.

As emulsifying agents, and by this term I mean to include also those substances which are termed protective colloids which I may or may not find it necessary to use I may mention certain clay-like substances, e. g. bentonite, soaps, and albuminous substances such as gelatin, glue, casein or haemoglobin. Certain flatting agents such as aluminium stearate also act as emulsifiers. It is to be understood that in preparing my emulsions I do not confine myself to any given proportions of resin, solvent, water, emulsifying agent, protective colloid or other ingredient, and that the examples given below illustrate, without limiting my invention.

As stated above I find that certain emulsifying agents serve another purpose in that they act also as flatting agents. By this I mean that the film I obtain when such of my emulsions as are here referred to are applied to a surface, is not a glossy film, but is semi-glossy or matt in appearance. This is a valuable property, difficult to obtain when lacquers or varnishes are used. It is difficult, in fact to incorporate flatting agents with lacquers or varnishes, whereas my emulsions, whether or not they already give coatings of a semi-glossy or matt appearance are capable of being converted into products possessed of this property, in that flatting agents e. g. aluminium stearate, can be incorporated with them to give a stable mixture. This can be done either during emulsification or emulsions can be prepared without flatting agents and the latter added and emulsified as may be convenient. I may add to my emulsions colouring matters, which may be either insoluble pigments or soluble dyestuffs, but I do not limit myself to any particular colouring matter or to any particular mode of incorporating the same. Further, with the object of rendering the coatings obtained by means of my invention plastic, I may add such plasticizers as e. g. dibutyl phthalate, tricresyl phosphate. Also I may incorporate such so-called driers as e. g. cobalt, linoleate, manganese resinate, in my emulsions. I may also add an acid catalyst such as sulphuric acid or acetic acid, with the object of accelerating the hardening of the film or coating. The incorporation or addition of any of the above substances may be carried out by known means at any stage in the preparation of the emulsion.

The following examples, in which the parts are by weight, illustrate but do not limit my invention.

*Example 1*

| | Parts |
|---|---|
| Polyhydric alcohol-polybasic acid resin | 50 |
| Solvent naphtha | 75 |
| Cobalt as cobalt linoleate | 0.1 |
| Sulphonated oil product known under the trade name of Agral WB | 3 |
| Bentonite | 5 |
| Water | 75 |

This resin is made in accordance with the procedure set forth in co-pending application Serial No. 464,701 filed June 28, 1930 by E. D. Walker and myself. The resin is made by heating 31 parts by weight of glycerol, 74 parts by weight phthalic anhydride and 75 parts by weight of castor oil to 210–220° C. with stirring until a clear solution is obtained. 10 parts of tung oil is then added and when the solution clears another 10 parts of tung oil is added. Similar additions of the tung oil are made until 50 parts in all have been incorporated. The temperature of the mass is then raised to and maintained at 240° C. until it nears the gel stage as shown by its viscosity. The product is a clear, deep straw-colored resin, soft, tacky, very tough and pliable.

The resin, drier and Agral WB are dissolved in the solvent naphtha and the solution is added with vigorous stirring to a suspension of the bentonite in water. This gives a stable emulsion of the oil in water type. It may be applied by known methods as a coating on any surface and dried by exposure or baked at e. g. 60° C.

*Example 2*

| | Parts |
|---|---|
| The resin of Example 1 combined with urea-formaldehyde resin | 11 |
| Polyhydric alcohol-polybasic acid resin | 30 |
| Solvent naphtha | 40 |
| Butyl alcohol | 19 |
| 1% gelatin solution | 75 |

The polyhydric alcohol-polybasic acid urea formaldehyde condensation product and polyhydric alcohol-polybasic acid resin are dissolved in a mixture of the solvent naphtha and butyl alcohol and the gelatin solution is added with stirring. This gives a stable water in oil emulsion. When it is applied the coating is preferably stoved at a temperature of over 100° C.

*Example 3*

| | Parts |
|---|---|
| The resin of Example 1 combined with urea-formaldehyde resin | 11 |
| Polyhydric alcohol-polybasic acid resin | 30 |
| Solvent naphtha | 14 |
| Butyl alcohol | 45 |
| Aluminium stearate | 7 |
| 1% gelatine solution in water | 60 |

The resins are dissolved in a mixture of the solvents and the aluminium stearate is suspended in the solution by stirring. The gelatine solution is added and the stirred mixture is passed through a colloid mill. This gives a stable emulsion of the water-in-oil type which can be applied in the usual way to e. g. rubber articles and the coating can be hardened by treating at 100° C. for 1 hour. The surface has then an excellent hard, flexible semi-gloss finish.

The combination of resins mentioned in Examples 2 and 3 is conveniently made by combining the polyhydric alcohol-polybasic acid resin with the urea formaldehyde condensation in a common solvent.

*Example 4*

| | Parts |
|---|---|
| The resin of Example 1 | 50 |
| White spirit | 33 |
| Butyl alcohol | 17 |
| Aluminium stearate | 10 |
| The sulphonated oil product known under the trade name of Agral WB | 2.5 |
| Bentonite | 5 |
| Water | 140 |

The resin is dissolved in a mixture of the organic solvents, the Agral WB is added and the aluminium stearate is suspended in the solution. The mixture is then added with stirring to the water which already contains the bentonite in suspension and the whole is passed through a colloid mill. A stable emulsion is produced which can be used for giving a semi-gloss finish to rubber, leather-cloth, etc. It may be either air-dried or stoved. The film is very flexible, has good resistance to abrasion and stands up satisfactorily to weathering trials.

As many apparently widely different embodiments of this invention may be made without departing from the spirit and scope thereof, it is to be understood that I do not limit myself to the specific embodiments thereof except as defined in the following claims.

I claim:—

1. A coating composition comprising an aqueous emulsion of a glycerol phthalate resin, an organic solvent for the resin, bentonite, aluminium stearate, and an emulsifying agent of the sulphonated oil type.

2. A coating composition comprising aluminum stearate and an aqueous emulsion of a solution of a polyhydric alcohol-polybasic acid resin in organic solvent.

3. The composition set forth in claim 2 in which the resin is an oil modified glyceryl phthalate resin.

WILLIAM BAIRD.